United States Patent Office 2,840,551
Patented June 24, 1958

2,840,551

OLEFIN POLYMERIZATION WITH CATALYSTS PREPARED FROM BORON COMPOUNDS AND TRANSITION METAL COMPOUNDS

Edmund Field, Chicago, Herbert N. Friedlander, Homewood, and Omar O. Juveland, Chicago, Ill., assignors to Standard Oil Company, Chicago, Ill., a corporation of Indiana No Drawing. Application August 18, 1955
Serial No. 529,323

21 Claims. (Cl. 260—93.7)

This invention relates to novel catalysts, processes for the preparation of such catalysts, and processes for the polymerization of ethylenically unsaturated compounds, particularly hydrocarbons, with said novel catalysts. The present invention provides novel processes for the homo- or hetero-polymerization of normally gaseous n-alkenes to produce high molecular weight, normally solid materials, especially highly crystalline, resinous materials.

One object of our invention is to provide new catalysts for the polymerization of olefinic hydrocarbons or other compounds containing aliphatic (ethylenic) unsaturation. Another object is to provide new methods for the preparation of polymerization catalysts. A third object is to provide processes for the homo- or hetero-polymerization of ethylene and propylene to yield resinous polymers, in which processes novel catalysts or combinations of catalysts are used. Yet another object is to provide new processes for the polymerization of ethylene and/or other normally gaseous unbranched alkenes to solid polymers having high molecular weights and high crystallinity. A further object is to provide a process for the production of the so-called "isotaxic" polymers from propylene, 1-butene, styrene and the like (note G. Natta, J. Poly. Sci. 25, pp. 143–155 (April 1955)).

We have discovered that ethylene and/or propylene can be polymerized at relatively high rates under mild polymerization conditions with certain novel catalysts to yield normally solid polymers. These novel catalysts are prepared by the admixture of certain boron compounds with a salt of a metal selected from Groups 4a, 5a, 6a and 8 of the Mendeleeff Periodic Table. The selected compounds of boron are the hydrides and hydrocarbon derivatives of boron. It appears that under the conditions of polymerization the boron compounds react with the metal salt to effect at least partial reduction of the latter and/or the formation of various complexes. While the precise nature of the polymerization catalysts is not known to us, we do know that the specified mixtures function, under polymerization conditions, as highly active catalysts for the polymerization of ethylenically unsaturated compounds. The admixture and/or interaction of said boron compounds and said metal salts is preferably effected in a liquid medium, for example, a saturated hydrocarbon such as heptane, isooctane, dodecane, cyclohexane, methylcyclohexane, cyclopentane and the like, or in an aromatic hydrocarbon such as benzene, toluene, ethylbenzene, xylenes, mesitylene, etc. An ether may constitute the liquid medium or may be used together with a liquid hydrocarbon. Suitable ethers include diethyl ether, methyl t-butyl ether, tetrahydrofuran, 1,4-dioxane, dioxolanes, etc. The proportion of liquid medium based upon the catalyst components will be selected within the range of about 0.5 to 10 parts by weight per part by weight of said components. The liquid medium can be purified by known methods to remove materials which react with the catalyst components.

The boron hydride used in preparing our catalytic compositions is usually diborane ($B_2H_6$), although other hydrides of boron can also be used. Some of the hydrides of boron such as $BH_3$, $B_4H_{10}$, $B_5H_{11}$ and $B_6H_{12}$ are relatively unstable materials and decompose under ordinary conditions to produce various polymeric hydrides of boron. However, with suitable precautions, they may be used in the preparation of catalytic materials for our invention. The relatively stable boron hydrides are diborane, pentaborane ($B_5H_9$), hexaborane ($B_6H_{10}$), and decaborane ($B_{10}H_{14}$). Because of its high catalytic efficiency and relative ease of preparation, we prefer to employ diborane in the preparation of catalytic materials for the purposes of our invention.

Hydrocarbon derivatives of boron which may be used in the practice of our invention include alkyl borons, cycloalkyl borons, aryl borons and the like. Examples of alkyl borons which can be used include, trimethyl boron, triethylboron, tripropyl boron, tributyl boron, tridecyl boron and the like. Examples of aryl borons include triphenyl boron, tritolyl boron, tri-p-xylyl boron, trinaphthyl boron and the like. Mixed hydride-hydrocarbon derivatives of boron can also be used, e. g. symmetrical or asymmetrical dimethyldiborane, methyldiborane and the like. We may also use hydrocarbon-halogen derivatives of boron, e. g. dimethylboron bromide, dimethylboron iodide, diphenylboron bromide or chloride, etc.

Salts of the following metals can be used in the preparation of polymerization catalysts for the purposes of our invention: Ti, Zr, Hf, Th, V, Nb, Ta, U, Cr, Mo, W, Mn, Fe, Co, Ni, Ru, Rh, Pd, Os, Ir, Pt or mixtures of salt of said metals. We can employ the metal salts of various mineral acids, for example, the hydrohalogen acids; oxyhalides, e. g. titanyl chloride or vanadyl chloride and the like; salts of acids of phosphorus, sulfur, nitrogen, etc. We may also use the metal cyanides, cyanates, isocyanates, thiocyanates, isothiocyanates, azides, etc. The metal salts of carboxylic or sulfonic acids may also be used. Also, we may use metal derivatives, classified herein as salts, having the formula $M(OR)_n$, wherein M represents the polyvalent metal, R is an alkyl or aryl radical, and $n$ is the valence of M, for example, $Ti(OC_2H_5)_4$, $Ti(OC_3H_7)_4$, $Ti(OC_4H_9)_4$, tetra-2-ethylhexyl titanate, tetrastearyl titanate, tetraphenyl zirconate and the like, for example, the metal derivatives of the enol forms of acetylacetone, acetoacetic ester and the like.

The preparation of the catalyst can be effected in the presence of various solid materials, such as carbon, silica, alumina, bauxite, fluorided alumina, synthetic or natural aluminosilicates, magnesia, titania, zirconia, powdered aluminum fluoride, sodium fluoride, sodium chloride, cryolite or the like. The added solid materials can comprise from about 10 to 200 weight percent, based on the weight of the materials which are allowed to react to form the polymerization catalysts.

The molar ratios of boron compound to metal salt can generally be varied broadly, e. g. over the range of about 0.1 to about 20, more or less, although a ratio of at least 1 is preferred. More often, about 1 to about 8 mols of boron compound is used per mol of metal salt.

In some instances in which the boron compound and metal salt are mixed in a liquid medium, a precipitate is formed. The catalytic mixture containing the precipitate can be used as such or can be treated by grinding, or otherwise, to reduce the particle size of the precipitate before use; even a filtrate can be used, although it may contain colloidal particles in suspension in the liquid medium.

The catalytic materials prepared as described above are enormously active catalysts for the polymerization of ethylene, propylene, isobutylene, butenes, butadiene, styrene, or hydrocarbon derivatives containing ethylenic unsaturation, e. g. tetrafluoroethylene. We may use normally gaseous olefin streams that contain normally gaseous paraffinic hydrocarbons and/or more than one olefinic hydrocarbon, e. g. as in petroleum refinery gas streams produced by thermal or catalytic cracking or dehydrogenation, e. g. refinery ethylene fractions, propylene fractions, ethylene-propylene fractions, butylene fractions, etc.

Polymerization of ethylenic compounds can be effected at selected temperatures which vary somewhat in accordance with the polymerization activity of the specific monomer, activity of the catalyst and the type of product which is desired. The selected polymerization temperatures generally fall within the range of about −40° C. to about 300° C., more often about 0° C. to about 250° C., say about 50° C. to 200° C.

The polymerization is preferably effected in the absence of impurities which react with and consume the catalysts or the components of the catalytic mixture, such impurities being oxygen, carbon dioxide, water, etc.

Polymerization may be effected at atmospheric pressure or even lower pressures, but it is advantageous to use superatmospheric pressure, especially with volatile monomers, in order to obtain desirable monomer concentrations in contact with the catalyst. Thus, in the polymerization of various monomers, especially the normally gaseous alkenes, the polymerization may be conducted at pressures up to 10,000 p. s. i. or even higher pressures. Polymerization of ethylenic compounds, e. g., ethylenic hydrocarbons, can usually be performed with the catalysts of this invention, even at pressures in the range of about 15 to about 150 p. s. i. a., although the range of about 50 to about 2000 p. s. i. a. is generally more suitable.

The weight ratio of catalyst mixture to monomer can generally be varied in the range of about 0.01 to about 10% by weight, for example, about 0.1 to about 5 weight percent.

Polymerization can be effected by contacting the olefin feed stock at the selected temperature and pressure (as a vapor, gas or liquid, as the case may be) with the mixture produced by the interaction of the catalyst components or with individual components of said mixture which exhibit catalytic activity.

Polymerization is preferably performed in the presence of various reaction media which remain liquid under the selected polymerization conditions of temperature and pressure. We prefer to employ relatively inert liquid reaction media such as saturated hydrocarbons, aromatic hydrocarbons, relatively unreactive alkenes (containing a non-terminal double bond) and cycloalkenes, perfluorocarbons, chloro-aromatics; various ethers such as ethyl ether, tetrahydrofuran, 1,4-dioxane, dioxolanes and the like, or mixtures of suitable liquids.

Suitable agitation of the catalyst and monomer(s) is provided to secure effective contacting by means which are well known.

Through the present process, we can convert ethylene to wax-like homopolymers having an approximate specific viscosity ($\times 10^5$) between about 1000 and 10,000 and tough, resinous ethylene homopolymers having an approximate specific viscosity ($\times 10^5$) of 10,000 to more than 300,000. Propylene can be polymerized by the present process to normally solid materials which soften at temperatures well above room temperature, for example, at least about 75° C. or even much higher temperatures.

The polymeric products produced by the processes encompassed within the scope of our invention can be subjected to a variety of treatments designed to remove all or part of the catalytic materials therefrom. Thus the polymers can be washed with methanol, alcoholic acids or alkalies and the like to wash out the inorganic impurities.

The polymer products can be dissolved in hot solvents, for example in aromatic hydrocarbons such as xylenes, and the resultant solutions can be treated to separate polymer having a relatively low content of material derived from the catalyst component. Thus hot aromatic hydrocarbon solutions of polymer can be subjected to the action of various hydrolytic agents to precipitate metal hydroxides which can then be separated from the remaining solution by centrifuging, decantation, filtration or other means. Alternatively, the hot aromatic hydrocarbon solution of polymer can be cooled or treated with precipitants or antisolvents such as acetone, methanol or the like to precipitate a small proportion, say up to about 5 weight percent of the solute polymer, which precipitate contains a very large proportion of the inorganic materials which were originally present in the polymer. The aromatic solvent can be recovered from the aforementioned operations and can be reused.

When very high yields of solid ethylene polymers or other solid polymers, based on the weight of catalyst, are obtained according to this invention, for example yields of at least 100 or 200 grams of solid polymer per gram of catalyst, it may not be necessary for industrial purposes to remove catalyst from the polymer since its concentration by weight therein will be 1 weight percent or even less. It will be appreciated that such a low ash content in solid polymers is, for the most uses of the polymers, an insignificant quantity which will not affect their utility or processing characteristics. The polymers of the present invention can be used or treated as the polymers whose preparation is described in U. S. P. 2,691,647 of Edmund Field and Morris Feller, granted October 12, 1954. Stabilizers which have been found effective in preventing hydrogen chloride evolution from chlororubber, chlorinated waxes and chloro-vinyl polymers may be added to the products of this invention which may contain residual halide catalyst component.

The following examples are intended to illustrate our invention but not necessarily to delimit its scope, which is broad.

*Example 1*

To a solution of 1.4 g. $TiCl_4$ in 50 ml. heptane in a glass pressure flask were added 2 ml. tri-n-butylboron and the mixture was heated and stirred at 90° C. under 50 p. s. i. g. of ethylene (unpurified commercial cylinder product) for 4 hours. This reaction yielded 0.3 g. of a white, tough, solid polyethylene having a specific viscosity of $8400 \times 10^{-5}$.

*Example 2*

To a solution of 0.19 g. $TiCl_4$ in 50 ml. heptane in a 100 ml. Magne-Dash reactor was added 1.1 g. of tri-n-butylboron and the mixture was heated with stirring to 150° C. in an atmosphere of hydrogen. Then ethylene was introduced at the pressure of 1100 p. s. i. g. from a commercial cylinder and reaction was continued for 6 hours to yield a tough, white, solid polymer.

*Example 3*

To a solution of 0.19 g. $TiCl_4$ in 50 ml. heptane in a 100 ml. Magne-Dash reactor was added 0.3 g. diborane and the mixture was heated with stirring in a hydrogen atmosphere to 150° C. Then ethylene was introduced into the reactor under the pressure of 1100 p. s. i. g. for 10 hours to yield 1.26 g. of a white, tough, solid polymer. The polymer had a density ($d\ 20/4$) of 0.9831 and melt viscosity of $1 \times 10^4$ poises.

A mixture of 0.5 g. of diborane and 2.6 g. of $BF_3$ were heated with 16 g. ethylene and 130 ml. heptane in a 300 ml. rocking bomb at temperatures ranging from 25 to 130° C. and pressures of 400 to 940 p. s. i. g. over a period of 8 hours in an attempt to obtain polymerization. It was found, however, that no ethylene polymerization could be obtained with the stated catalysts under the specified conditions.

*Example 4*

A 100 ml. Magne-Dash reactor was charged with 50 ml. of dried heptane, 0.7 g. of molybdenum pentachloride and 0.2 g. of diborane and the mixture was heated with stirring to 125° C. under an ethylene pressure of approximately 1100 p. s. i. for 11 hours to yield 2.23 g. of a tough, solid polymer of ethylene having a specific gravity ($d\ 20/4°$ C.) of 0.9607 g./cc. and melt viscosity of $1.2 \times 10^6$ poises. Also recovered were 1.42 g. of a grease-like polymer of ethylene.

*Example 5*

A 100 ml. Magne-Dash reactor was charged with 50 ml. of dried heptane, 0.32 g. of $CoCl_2$ and 0.4 g. of diborane. The contents of the reactor were heated with stirring to 125° C. under 1125 p. s. i. of commercial cylinder ethylene for 11 hours to yield 0.22 g. of a tough, white, solid polymer of ethylene and 0.18 g. of grease-like polyethylenes.

*Example 6*

A 250 ml. Magne-Dash reactor was charged with 100 ml. of dried heptane, 0.95 g. of titanium tetrachloride and 6.8 g. of sodium tetraphenyl boron $$NaB(C_6H_5)_4$$

The contents of the reactor were heated to 170° C. under initial ethylene pressure of 1120 p. s. i. and reaction was continued for 10.5 hours with intermittent ethylene injection. The principal reaction product was a tough, solid polyethylene having a specific gravity ($d\ 20/4°$ C.) of 0.9752 g./cc. and melt viscosity of $3.8 \times 10^6$ poises, produced in the amount of 9.15 g. Also recovered were 1.51 g. of grease-like polyethylenes.

*Example 7*

The process of Example 6 is repeated but propylene is substituted for ethylene in amount sufficient to create a partial pressure of about 700 p. s. i. in order to obtain a solid polymer of propylene.

*Example 8*

The process of Example 4 is repeated but an equimolar proportion of vanadium tetrachloride is substituted for molybdenum pentachloride to produce a normally solid polymer from ethylene.

Having described our invention, what we claim is:

1. A process for the polymerization of an olefinic hydrocarbon, which process comprises contacting said tydrocarbon under polymerization conditions with a catalyst prepared by mixing a boron compound selected from the class consisting of hydride and hydrocarbon derivatives of boron with a polyvalent metal salt of a metal selected from Groups 4a, 5a, 6a and 8 of the Mendeleeff Periodic Table, and recovering a polymer thus produced.

2. The process of claim 1 wherein said hydrocarbon is ethylene.

3. The process of claim 1 wherein said hydrocarbon is propylene.

4. A process for the polymerization of an olefinic hydrocarbon, which process comprises contacting said hydrocarbon under polymerization conditions with a catalyst prepared by mixing a hydride of boron with a polyvalent metal salt of a metal selected from Groups 4a, 5a, 6a and 8 of the Mendeleeff Periodic Table, and recovering a polymer thus produced.

5. The process of claim 4 wherein said hydride is diborane.

6. A process for the polymerization of an olefinic hydrocarbon, which process comprises contacting said hydrocarbon under polymerization conditions with a catalyst prepared by mixing a hydrocarbon derivative of boron with a polyvalent metal salt of a metal selected from Groups 4a, 5a, 6a and 8 of the Mendeleeff Periodic Table, and recovering a polymer thus produced.

7. The process of claim 6 wherein said hydrocarbon derivative of boron is an alkyl boron.

8. The process of claim 6 wherein said hydrocarbon derivative of boron is an aryl boron.

9. A process for the production of a normally solid polymer from a normally gaseous unbranched alkene, which process comprises contacting said alkene under polymerization conditions with a catalyst prepared by mixing a boron compound selected from the class consisting of hydride and hydrocarbon derivatives of boron with a polyvalent salt of a metal selected from Groups 4a, 5a, 6a and 8 of the Mendeleeff Periodic Table, and recovering a normally solid polymer thus produced.

10. The process of claim 9 wherein said hydrocarbon derivative of boron is an alkyl boron.

11. The process of claim 9 wherein said hydrocarbon derivative of boron is an aryl boron.

12. The process of claim 9 wherein said hydride derivative of boron is diborane.

13. The process of claim 9 wherein said alkene is ethylene.

14. The process of claim 9 wherein said alkene is propylene.

15. A process for the production of a normally solid polymer from ethylene, which process comprises contacting ethylene under polymerization conditions including a temperature between about 50° C. and about 200° C. with a catalyst prepared by mixing diborane with titanium tetrachloride, and recovering a normally solid polymer thus produced.

16. A process for the production of a normally solid polymer from ethylene, which process comprises contacting ethylene under polymerization conditions including a temperature between about 50° C. and about 200° C. with a catalyst prepared by mixing diborane with molybdenum pentachloride, and recovering a normally solid polymer thus produced.

17. A process for the production of a normally solid polymer from ethylene, which process comprises contacting ethylene under polymerization conditions including a temperature between about 50° C. and about 200° C. with a catalyst prepared by mixing diborane with cobalt chloride, and recovering a normally solid polymer thus produced.

18. A process for the production of a normally solid polymer from ethylene, which comprises contacting ethylene under polymerization conditions including a temperature between about 50° C. and about 200° C. with a catalyst prepared by mixing tributyl boron with titanium tetrachloride, and recovering a normally solid polymer thus produced.

19. A process for the production of a normally solid polymer from ethylene, which process comprises contacting ethylene under polymerization conditions including a temperature between about 50° C. and about 200° C. with a catalyst prepared by mixing sodium tetraphenyl boron with titanium tetrachloride, and recovering a normally solid polymer thus produced.

20. A process for the production of a normally solid polymer from propylene which process comprises contacting propylene under polymerization conditions including a temperature between about 50° C. and about 200° C. with a catalyst prepared by mixing sodium tetraphenyl boron with titanium tetrachloride, and recovering a normally solid polymer thus produced.

21. A process for the production of a normally solid polymer from ethylene, which process comprises contacting ethylene under polymerization conditions including a temperature between about 50° C. and about 200° C. with a catalyst prepared by mixing diborane with titanium tetrachloride in a molar ratio between about 0.1 and about 20, the proportion of catalyst mixture to ethylene being between about 0.01 and about 10 percent by weight, and recovering a normally solid polymer thus produced.

References Cited in the file of this patent

UNITED STATES PATENTS 2,721,189    Anderson _____ Oct. 18, 1955